United States Patent [19]

Pawlowski, Jr.

[11] Patent Number: 4,731,604

[45] Date of Patent: Mar. 15, 1988

[54] PORTABLE DISTRESS SIGNAL DEVICE FOR INDICATING TROUBLED SITUATIONS AND METHOD FOR ITS MANUFACTURE

[76] Inventor: Thomas J. Pawlowski, Jr., 921 Jeremy La., Libertyville, Ill. 60048

[21] Appl. No.: 894,042

[22] Filed: Aug. 7, 1986

[51] Int. Cl.$^4$ .............................................. G08B 13/00
[52] U.S. Cl. ..................................... 340/574; 362/208
[58] Field of Search ................. 340/574, 321; 362/208, 362/196, 202, 205; D26/37

[56] References Cited

FOREIGN PATENT DOCUMENTS 2406859  6/1979  France ................................. 340/574

Primary Examiner—Glen R. Swann, III
Assistant Examiner—Thomas J. Mullen, Jr.
Attorney, Agent, or Firm—Richard C. Litman

[57] ABSTRACT

A portable hand held distress signal device having a casing member for receiving dry cell batteries with the casing having positive and negative terminals and an ON-OFF switch connected in series therewith, a dome member of generally red plastic transparent material having an end portion for receiving a signal member and an enlarged portion for receiving a control member and an engaging portion for connecting securably with a mating engaging portion of the casing member, the control member including a frame member having respective current terminals for engaging with the terminals of the casing member, a buzzer and motor in the control member connected in circuit with the terminals of the signal member, a shaft of the motor driving reduction gears which in turn rotate a metal shaft extending within the dome member, a reflector and bulb holder supported at the distal end of the metal shaft and for supplying current from one of the terminals thereto, a metal disk having a central opening for passing the metal shaft therethrough and being mounted on the frame connected to the other of the terminals, and a trolley mounted on the reflector and bulb means extending in contact with the metal disk for completing the circuit of the one terminal to the other terminal. The device is further summarized as a portable hand-held visually and audibly detectable distress signal device, particularly suited for hikers, campers, mountain climbers, senior citizens, school children, broken down RV's, planes, cars, boats, life rafts, motorcycles, workers in mines, tunnels, and the like, for seeking and attracting the attention of others when in a troubled situation.

15 Claims, 2 Drawing Figures

PORTABLE DISTRESS SIGNAL DEVICE FOR INDICATING TROUBLED SITUATIONS AND METHOD FOR ITS MANUFACTURE

BACKGROUND OF THE INVENTION

1. Field of the Invention

The invention relates to an improved distress signal device and its method of manufacture, and more particularly the invention relates to a portable, hand-held distress signal device for indicating troubled situations, the device having a casing member for receiving current from dry cell batteries, with the casing having positive and negative terminals and an ON-OFF switch connected in series therewith, a dome member of generally red or other colored plastic transparent material having an end portion for receiving a signal member and an enlarged portion for receiving a control member and an engaging portion for connecting securably with a mating engaging portion of the casing member, the control member including a frame member having respective current terminals for engaging with the terminals of the casing member, a buzzer and motor in the control member connected in circuit with the terminals of the signal member, a shaft of the motor driving reduction gears which in turn rotate a metal shaft extending within the dome member, a reflector and bulb holder supported at the distal end of the metal shaft and for supplying current from one of the terminals thereto, a metal disk having a central opening for passing the metal shaft therethrough and being mounted on the frame connected to the other of the terminals, and a trolley mounted on the reflector and bulb means extending in contact with the metal disk for completing the circuit of the one terminal to the other terminal.

The invention relates further to a portable hand held device having a rotating white light covered by a generally red or colored dome forming a distress signal device, the rotating action caused by a motor and the container including a buzzer together with the motor and light energized by a battery thereof, such as dry cell batteries, as more particularly described herein.

2. Description of the Prior Art

Various prior art distress signal devices, and the like, as well as apparatus and method of their construction in general, are found to be known and exemplary of the U.S. prior art are the following:

U.S. Pat. No. 3,794,791—Thomson,
U.S. Pat. No. 4,041,452—Moya,
U.S. Pat. No. 4,247,844—Zapolski,
U.S. Pat. No. 4,254,405—Wenzlaff,
U.S. Pat. No. 4,432,041—Pfisterer et al.

These patents or known prior uses teach and disclose various types of light and audibility features of sorts and of various manufactures and the like as well as methods of their construction, but none of them whether taken singly or in combination disclose the specific details of the combination of the invention in such a way as to bear upon the claims of the present invention.

SUMMARY OF THE INVENTION

An object, advantage and feature of the invention is to provide a novel hand-held, portable distress signal device having a construction resembling a kind of trolley assembly including a metal disk having a central opening for passing a metal shaft therethrough and being mounted on a frame connected to the other of the terminals, and a trolley member mounted on a reflector and bulb assembly extending to contact with the metal disk for completing the circuit of the one terminal to the other terminal.

Another object of the invention is directed further to a portable hand held device providing for a simply constructed assembly of a motor, light and buzzer so the light may rotate without obstruction and provide an adequate alarm.

Also an object of the invention is to provide a simple and direct method for the improved construction of a distress signal device that overcomes each and every objection above stated.

These together with other objects and advantages which will become subsequently apparent reside in the details of the process and operation thereof as more fully hereinafter is described and claimed, reference being had to the accompanying drawings forming a part thereof, wherein like numerals refer to like parts throughout.

DESCRIPTION OF A PREFERRED EMBODIMENT OF THE INVENTION

Figure 1:
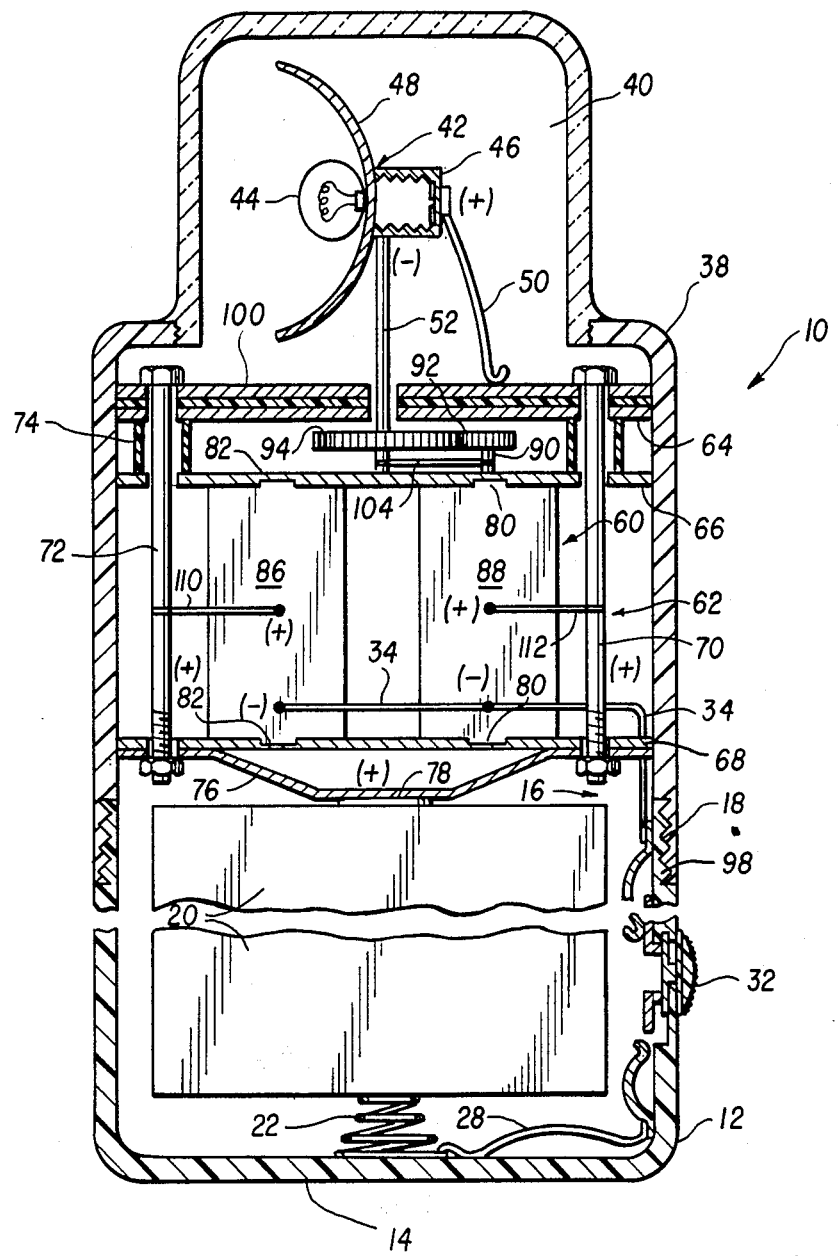
FIG. 1 is a sectional view of a distress signaling device and illustrating a typical installation of the device according to a preferred embodiment and best mode of the present invention.
Figure 2:
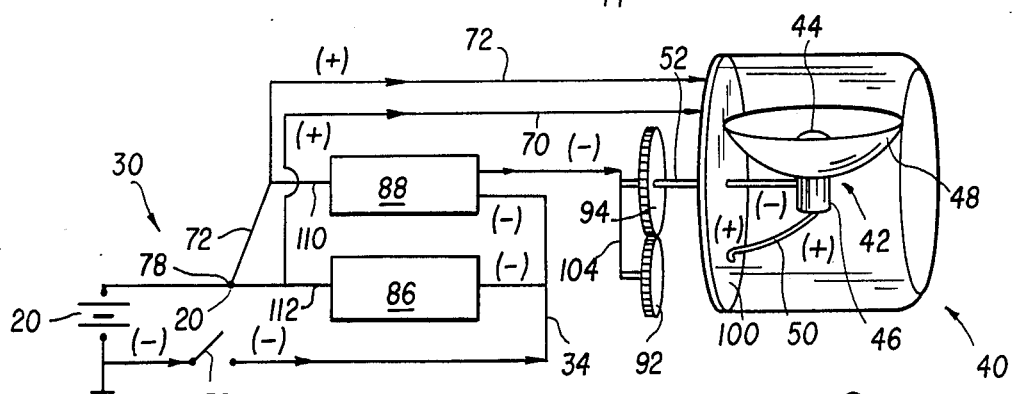
FIG. 2 is a schematic circuit diagram of the novel distress signal device and further embodying the concepts of the invention.

Referring now to the drawings there is shown in the Figures a distress signal device 10 having a bottom or base case or casing 12 of a non-metallic or plastic material of generally a cylindrical configuration closed at one end 14 and open at the other end 16 and having a coupling member such as a threaded means 18. Within the casing 12 is a series or set of batteries 20 of an usual arrangement such as drycells as well known in the art and having a spring 22 for biasing the batteries generally upwardly. The casing 12 includes a wire or conductor 28 contained in an electrical system 30 connecting the spring 22 to a switch 32 of conventional construction, while at the other end of the conductor 28 contact is made to a terminal 34 when switch 32 is moved to its ON position. The distress signal device 10 also includes a dome member 38 of a transparent material and also of a closed end portion 40 for receiving a signal unit 42 consisting of a light bulb 44, a light socket 46, a reflector 48, and a trolley 50, all of which are supported for rotation about a revolving metal stem or metal shaft 52 supported as described below.

The dome member 38 contains further a control unit 60 consisting of a frame 62 formed of plates 64, 66, 68 clamped by bolts 70, 72, sleeves 74 and secured by nuts on the bolts in the usual manner. Beneath the plate 68 is a metal body 76 having a battery terminal engaging member 78 contacting the battery 20 in typical fashion. The plate 68 supports the terminal 34 described above and the plates 66, 68 further contain recesses 80, 82 for engaging projections extending from a buzzer 86 and motor 88 of the control unit 60.

The motor 88 contains a motor shaft 90 coupled to reducing gears 92, 94 and the gear 94 supports and drives the metal shaft 52 in rotation as described above. The reduction gears 92 reduce the motor speed so as to cause the light to rotate slowly and to make it more visible.

The dome member 38 is secured on the casing 12 by a threaded means 98 for engaging threaded means 18.

On the upper surface of the plate 64 is a metal disk 100 on which the trolley 50 trolls in circular paths as the signal unit 42 is caused to rotate as the motor 88 drives it when energized. The circuit path for the energization of the signal unit 42 is through the switch 32, the terminal 34, the the buzzer 86, motor 88, shaft 90, conductor 104 to shaft 52 to the negative side of the bulb; the terminal engaging member 78 contacts the buzzer 86 at conductor 110, contacts the motor 88 at conductor 112 up through the bolts 70, 72, which also contact the metal disk 100 and then through the trolley 50, trolling on the metal disk 100 to the positive side of the light bulb 44.

The apparatus of the distress signal device 10 of the invention may be so constructed and arranged in its component parts that it may be assembled as a kit or in kit form.

The foregoing is considered as illustrative only of the principles of the invention. Further, since numerous modifications and changes will readily occur to those skilled in the art. it is not desired to limit the invention to the exact construction and operation shown and described, and accordingly, all suitable modifications and equivalents may be resorted to falling within the scope of the invention.

What is claimed and desired to be secured by Letters patent is:

1. A portable distress sigal device comprising
   casing means for receiving current storage means with positive and negative terminals and having an ON-OFF switch connected in series therewith,
   dome member of generally transparent material having an end portion for receiving a signal means and an enlarged portion for receiving control means and an engaging portion distal to the end portion for connecting securably with a mating engaging portion of the casing means, the control means including frame means having respective current terminals for engaging with the terminals of the casing means,
   buzzer and motor means in the control means connected in parallel circuit relation with the terminals of the frame means in the dome member,
   a shaft of the motor means driving reduction gears one of which in turn is connected to a proximate end of a support metal shaft extending within the dome member and drives the shaft in rotation,
   means supporting a reflector and bulb holder at a distal end of the support metal shaft and for supplying current thereto from one of the terminals of the frame means,
   a metal disk having a central opening for passing the support metal shaft therethrough and the metal disk being mounted on the frame means connected to the other of the terminals of the frame means, and
   means mounted on the reflector and bulb means extending in trolley contact with the metal disk for completing the circuit of the one terminal to the other terminal of the frame means.

2. The apparatus of claim 1 wherein the dome member is of plastic.
3. The apparatus of claim 1 wherein the dome member is generally red color material.
4. The apparatus of claim 1 wherein the casing means is a portable flashlight type casing.
5. The apparatus of claim 1 wherein the mating portions are threadedly coupled.
6. The apparatus of claim 1 wherein the buzzer and motor means are coupled in parallel to the current storage means.
7. The apparatus of claim 1 wherein the casing and the dome member are secured by threaded means.
8. A portable distress signal device comprising
   casing means for receiving current storage means with positive and negative terminals and having an ON-OFF switch connected in series therewith,
   dome member of generally transparent material having an end portion for receiving a signal means and an enlarged portion for receiving control means and an engaging portion distal to the end portion for connecting securably with a mating engaging portion of the casing means, the control means including frame means having respective current terminals for engaging with the terminals of the casing means,
   buzzer and motor means in the control means connected in parallel circuit relation with the terminals of the frame means in the dome member,
   a shaft of the motor means driving reduction gears one of which in turn is connected to a proximate end of a support metal shaft extending within the dome member and drives the shaft in rotation,
   means supporting a reflector and bulb holder at a distal end of the support metal shaft and for supplying current thereto from one of the terminals of the frame means,
   a metal disk having a central opening for passing the support metal shaft therethrough and the metal disk being mounted on the frame means connected to the other of the terminals of the frame means,
   a set of at least three plates in the frame means, one for supporting the metal disk and two having recesses for receiving a portion of and supporting the buzzer and motor, and
   means mounted on the reflector and bulb means extending in trolley contact with the metal disk for completing the circuit of the one terminal to the other terminal of the frame means.
9. The apparatus of claim 8 wherein the dome member is of plastic.
10. The apparatus of claim 8 wherein the dome member is generally of red colored material.
11. The apparatus of claim 8 wherein the casing means is a portable flash light type casing.
12. The apparatus of claim 8 wherein the mating portions are threadedly coupled.
13. The apparatus of claim 8 wherein the buzzer and motor means are coupled in parallel to the current storage means.
14. The apparatus of claim 8 wherein the casing and the dome member are secured by threaded means.
15. The apparatus of claim 8 wherein the electrical components are energized by closure of said switch means.

* * * * *